United States Patent
Rutkowski et al.

[11] Patent Number: 6,105,257
[45] Date of Patent: Aug. 22, 2000

[54] REMOTE GRIPPING OR CUTTING APPARATUS HAVING A ROTATABLE HEAD

[75] Inventors: Alan Rutkowski, Waunakee; Bill Freimuth, Verona; Mark Schaefer, Waukesha; Darrell Wiatrowski, Milwaukee, all of Wis.

[73] Assignee: Fiskars Inc., Madison, Wis.

[21] Appl. No.: 09/134,361

[22] Filed: Aug. 14, 1998

[51] Int. Cl.[7] .................................................. B26B 13/26
[52] U.S. Cl. ............................................... 30/199; 30/251
[58] Field of Search .............................. 30/199, 177, 134, 30/251, 190; 294/22, 23; 606/205, 174

[56] References Cited

U.S. PATENT DOCUMENTS

| | | |
|---|---|---|
| 32,327 | 5/1861 | Wood . |
| 160,464 | 3/1875 | Peabody . |
| 646,048 | 3/1900 | Donzella . |
| 2,550,874 | 5/1951 | Skoog ........................................ 30/190 |
| 2,602,994 | 7/1952 | McGary et al. ........................... 30/251 |
| 3,039,189 | 6/1962 | McBerty .................................... 30/245 |
| 5,084,975 | 2/1992 | Melter ....................................... 20/249 |
| 5,293,878 | 3/1994 | Bales et al. ......................... 606/205 X |
| 5,317,806 | 6/1994 | Held et al. ................................ 30/249 |
| 5,347,800 | 9/1994 | Morgan ..................................... 56/335 |

*Primary Examiner*—Douglas D. Watts
*Attorney, Agent, or Firm*—Foley & Lardner

[57] ABSTRACT

The invention is an apparatus having opposed jaws remotely located at a distance from actuator for the jaws. In particular, the apparatus has opposed jaws supported rotatably with respect to the actuator for the jaws. More particularly, the apparatus is a cutting device having opposed jaws located remotely and rotatably with respect to the jaw actuator for lopping limbs.

14 Claims, 12 Drawing Sheets

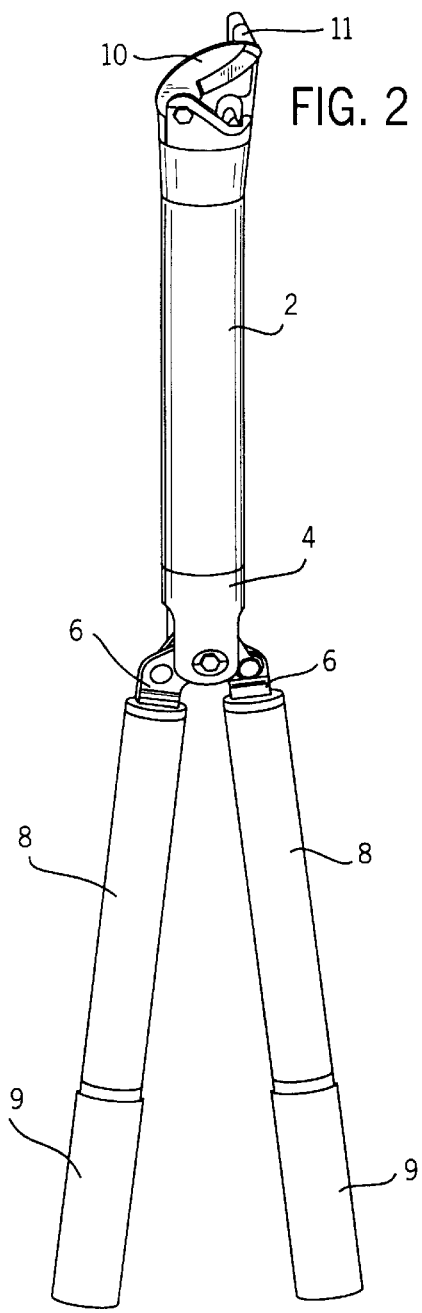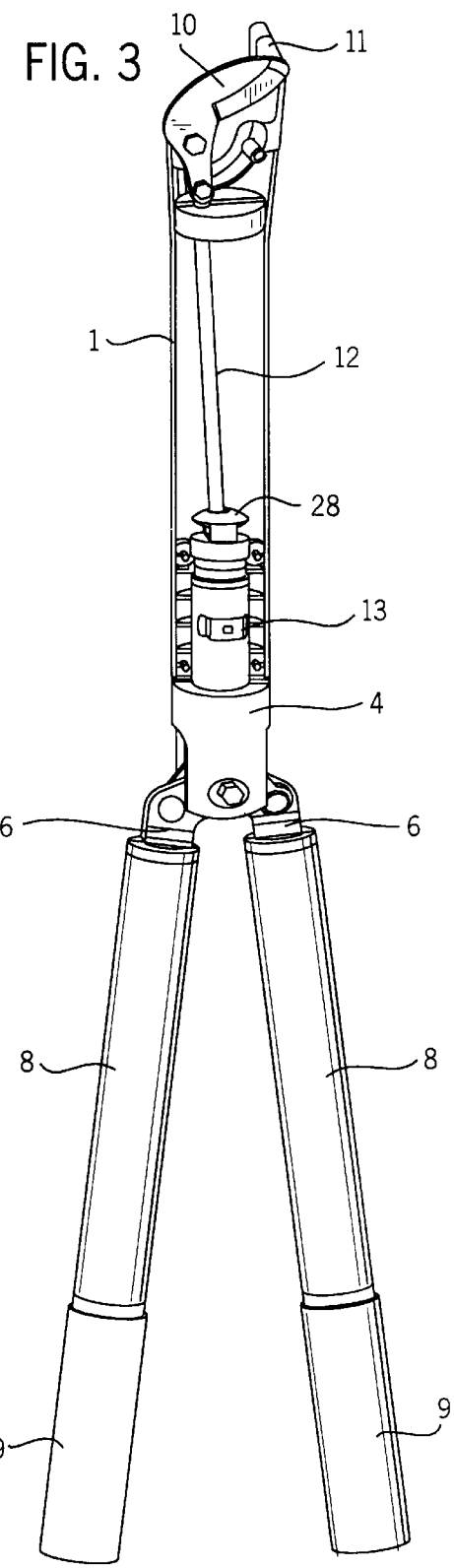

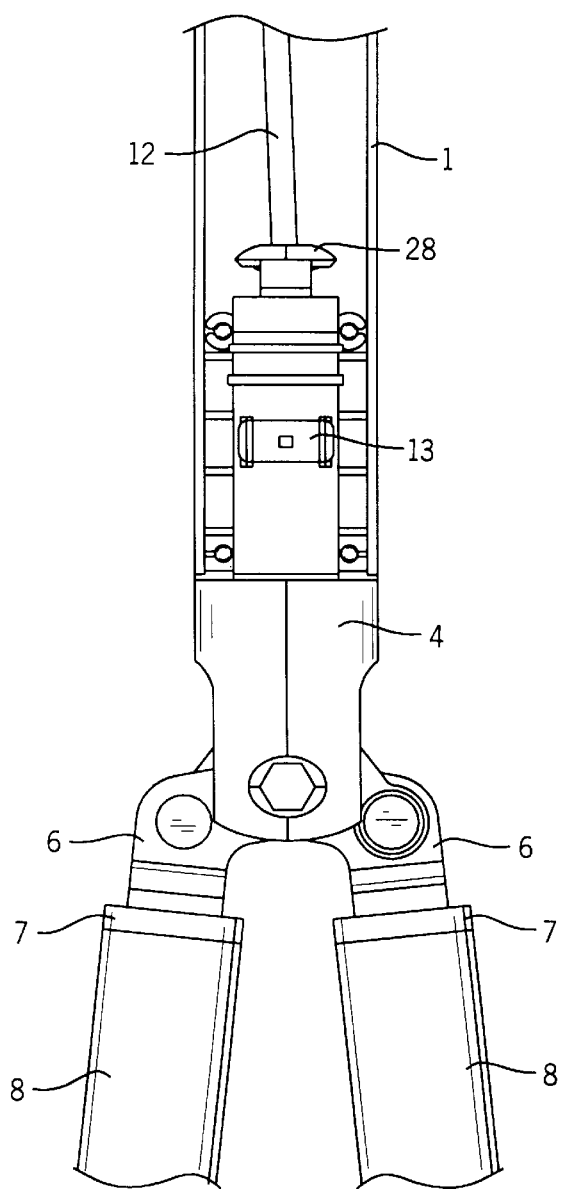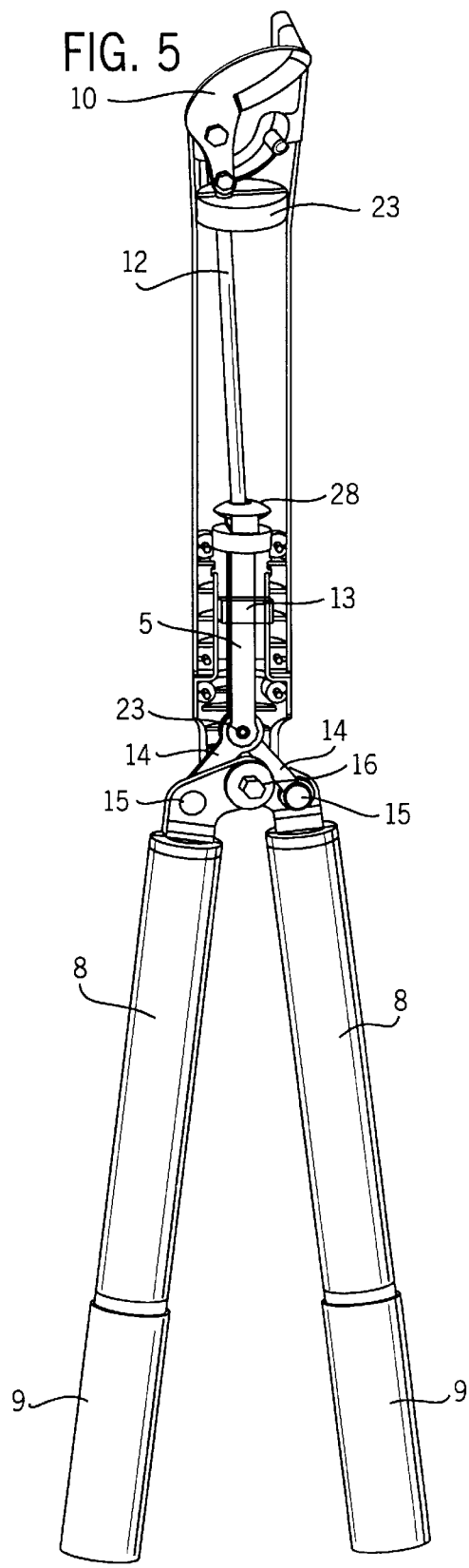

| TRIAL 1 | Fn | | | |
|---|---|---|---|---|
| STROKE | APPLIED FORCE | MECH. ADV. | ACTUAL FORCE | WORK |
| (in) | (Lbf) | | (Lbf) | (in·lb) |
| 0 | 20 | 21.8 | 432 | |
| 1.80 | 45 | 21.6 | 972 | 1652 |
| | | | | |
| | | | | |
| TRIAL 2 | | | | |
| STROKE | APPLIED FORCE | MECH. ADV. | ACTUAL FORCE | WORK |
| (in) | (Lbf) | | (Lbf) | (in·lb) |
| 0 | 15 | 21.8 | 324 | |
| 1.80 | 40 | 21.6 | 864 | 1361 |
| | | | | |
| | | | | |
| TRIAL 3 | | | | |
| STROKE | APPLIED FORCE | MECH. ADV. | ACTUAL FORCE | WORK |
| (in) | (Lbf) | | (Lbf) | (in·lb) |
| 0 | 15 | 21.8 | 324 | |
| 1.80 | 42 | 21.6 | 907.2 | 1400 |
| | | | | |
| | | | | |
| TRIAL 4 | | | | |
| STROKE | APPLIED FORCE | MECH. ADV. | ACTUAL FORCE | WORK |
| (in) | (Lbf) | | (Lbf) | (in·lb) |
| 0 | 10 | 21.8 | 216 | |
| 1.80 | 40 | 21.6 | 864 | 1165 |
| | | | | |
| | | | | |
| TRIAL 5 | | | | |
| STROKE | APPLIED FORCE | MECH. ADV. | ACTUAL FORCE | WORK |
| (in) | (Lbf) | | (Lbf) | (in·lb) |
| 0 | 12 | 21.8 | 259.2 | |
| 1.80 | 42 | 21.6 | 907.2 | 1283 |
| | | | | |
| | | | | |
| TRIAL 6 | | | | |
| STROKE | APPLIED FORCE | MECH. ADV. | ACTUAL FORCE | WORK |
| (in) | (Lbf) | | (Lbf) | (in·lb) |
| 0 | 17 | 21.8 | 387.2 | |
| 1.80 | 44 | 21.6 | 950.4 | 1518 |
| | | | | |
| TRIAL 7 | | | | |
| STROKE | APPLIED FORCE | MECH. ADV. | ACTUAL FORCE | WORK |
| (in) | (Lbf) | | (Lbf) | (in·lb) |
| 0 | 20 | 21.8 | 432 | |
| 1.80 | 45 | 21.6 | 972 | 1652 |
| | | | | |
| | AVERAGE FORCE | 42.8 | AVERAGE WORK | 1433 |

FIG. 12

REMOTE GRIPPING OR CUTTING APPARATUS HAVING A ROTATABLE HEAD

TECHNICAL FIELD OF THE INVENTION

The present invention is directed to an apparatus having opposed jaws remotely located at a distance from actuator for the jaws. In particular, the present invention is directed to an apparatus having opposed jaws supported rotatably with respect to the actuator for the jaws. More particularly, the present invention is directed to a cutting device having opposed jaws located remotely and rotatably with respect to the jaw actuator for lopping limbs.

BACKGROUND OF THE INVENTION

In some situations, a person may find that it is desirable to have the ability to grip or cut an object that is located at some distance away from the person. For example, a person may wish to reach an object at a location that is out of the grasping range of the person, such as retrieving an object from a shelf that is some distance over the head of the person. As another example, a person may wish to prune an object that is not readily accessible, such as lopping a tree limb that is some distance above the normal reach of the person.

In each of these examples, and particularly in the case of lopping a tree limb with a conventional cutting device, it is often necessary for the user to contort their body into an unbalanced, uncomfortable and/or unsafe position in order to properly orient the cutting device with respect to the limb.

Conventional lopper designs have wide handle openings and long handle lengths in order to obtain sufficient leverage for cutting large diameter branches and limbs. Typically, increasing the handle opening and/or lengthening the handles increases the leverage by increasing the mechanical advantage. As it is used here, the term "mechanical advantage" refers to a ratio of the force that performs the useful work of the lopper, i.e., the force supplied by the user, to the force that is applied by the lopper, i.e., the cutting force. Consequently, one disadvantage of conventional lopper designs is that they are oversized for the average user, making them more difficult to use.

Another disadvantage of conventional lopper designs is that increasing the mechanical advantage does not necessarily provide a greater cutting force. For example, if the user is unable to supply sufficient force because a conventional lopper is awkwardly positioned with respect to the limb, the cutting force will also not be sufficient to cut the limb.

Examples of conventional lopper designs are disclosed in the U.S. Pat. Nos. to Evans (No. 32,327), Miller (No. 160,464), Donzella (No. 646,048), McGary (No. 2,602,994), McBerty (No. 3,039,189), Melter (No. 5,084,975), Held et al. (No. 5,317,806) and Morgan (No. 5,347,800).

SUMMARY OF THE INVENTION

It is an object of the present invention to provide an apparatus having opposed jaws for gripping or cutting that are remotely located at a distance from the user, and which may be rotatably oriented to facilitate gripping or cutting. It is a particular object of the present invention to overcome the disadvantages of conventional lopper designs as described above.

Another object of the present invention to provide a remote gripping or cutting apparatus that is more efficient to use, both ergonomically and mechanically. Accordingly, specific dimensions such as maximum and minimum handle opening are selected on the basis of anthropomorphic data, and in the case of a cutting device, the mechanical advantage for the present invention is matched to a cutting force profile.

A further object of the present invention is to provide a remote gripping or cutting apparatus having a swiveling head such that the angular orientation of the head may be set in such a way that the jaws of the apparatus can be operated without requiring the user to contort their body into an unbalanced, unnatural or uncomfortable position. Yet a further object of the invention is to provide a cutting device having a swiveling head that enables the user to perform a cutting operation, regardless of the orientation of the object to be cut, in a manner that is the most efficient.

Yet another object of the present invention is to provide a remote gripping or cutting apparatus having a swiveling head that is readily turned and inherently retained in the turned position. Moreover, it is an object of the present invention to provide a cutting device having a swiveling head that enables optimizing the relationship of the cutting blades with respect to a limb to be lopped.

It is also an object of the present invention to provide a remote gripping or cutting apparatus having a swiveling head at the distal end of an extension. According to one embodiment of the present invention, lopping a limb at some distance from the user is readily accomplished, thus allowing the user to remain at a safe and comfortable distance from the limb. Moreover, and the head may be easily rotated by the user without withdrawing the head of the apparatus from the proximity of the limb to be lopped.

These and other objects are achieved according to the present invention by a remote gripping or cutting apparatus. The apparatus comprises a first handle pivotally connected to a second handle for relative motion in a common plane, the first and second handles being adapted for orientation in a minimal relative angular position and for orientation in a maximal relative angular position; a first link having first and second ends, the first end of the first link being pivotally connected to the first handle and the second end of the first link being adapted for linear reciprocating motion in responsive association with relative motion of the first and second handles between the minimal and maximal relative angular positions; a slider pivotally connected to the second end of the first link, the slider being adapted for linear reciprocating motion in responsive association with relative motion of the first and second handles between the minimal and maximal relative angular positions; a cylindrical extension extending substantially coaxially with respect to the linear reciprocating motion, the cylindrical extension having a proximal end being supported for relative rotation around the slider and having a distal end with respect to the first and second handles; a drag mechanism supported with respect to the cylindrical extension, the drag mechanism being adapted for providing a selected limited resistance to free relative rotation of the cylindrical extension with respect to the slider; and a first jaw pivotally connected with respect to a second jaw, the first jaw being supported with respect to the distal end of the cylindrical extension, the second jaw having an actuated arm and an actuating arm and having the pivotal connection with respect to the first jaw being interposed between the actuated and actuating arms, the actuating arm being pivotally connected with respect to the slider. The object is engaged by the actuated arm of the second jaw being pivoted toward the first jaw in responsive association with the linear reciprocating motion of the slider as the first and second handles are reoriented from the maximal relative angular position to the minimal relative angular position.

DESCRIPTION OF THE DRAWINGS

FIG. 2 is a perspective view of the apparatus for lopping illustrated in FIG. 1.

FIG. 3 is a partial cross section view of the apparatus for lopping illustrated in FIG. 1.

FIG. 4 is a detail view of the apparatus for lopping illustrated in FIG. 3.

FIG. 5 is another partial cross section view of the apparatus for lopping illustrated in FIG. 1.

FIG. 12 is a collection of test data indicative of the cutting forces necessary for severing a sample.

DETAILED DESCRIPTION OF THE INVENTION

A remote gripping or cutting apparatus according to the present invention is shown in FIGS. 1–7. An exemplary cutting device according to a preferred embodiment of the present invention is illustrated. However, it is to be understood that clamping jaws may be substituted for the cutting jaws, thus providing a remote gripping device or a remote cutting device.

The remote capability, i.e., the "reach", of the present invention, is determined in large part by the length of a neck tube comprising a bottom portion 1 and a top portion 2 that are fixedly connected together. As it is used here, the term "fixedly connected" includes integrally formed, single piece structures as well as multiple piece structures that are firmly secured with respect to one another by any suitable fastener(s) 25. Of course, the length of the tube may be selected so as to provide a desired reach.

Figure 1:
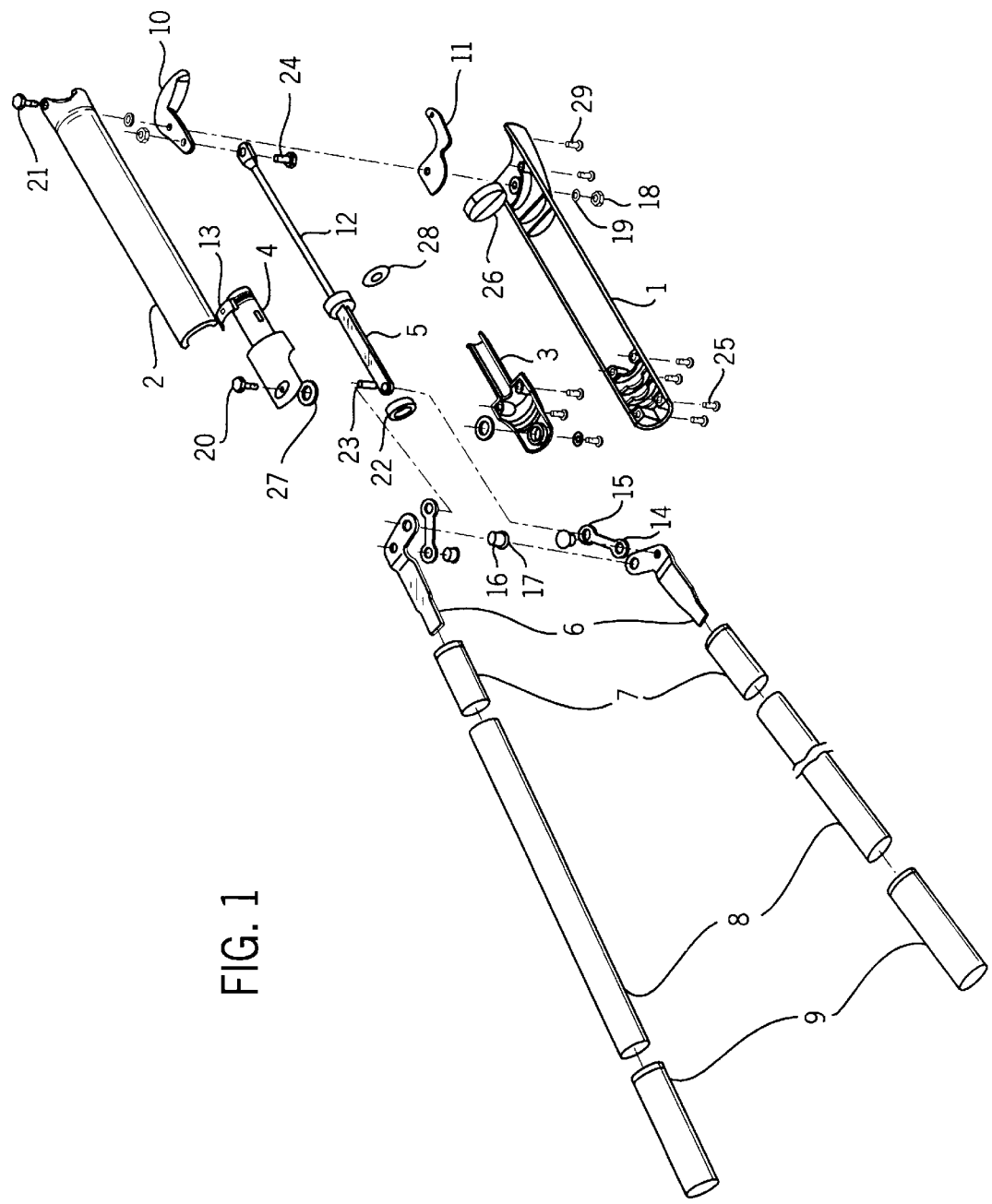
FIG. 1 is an exploded view of an apparatus for lopping according to a preferred embodiment of the present invention.
Figure 6:
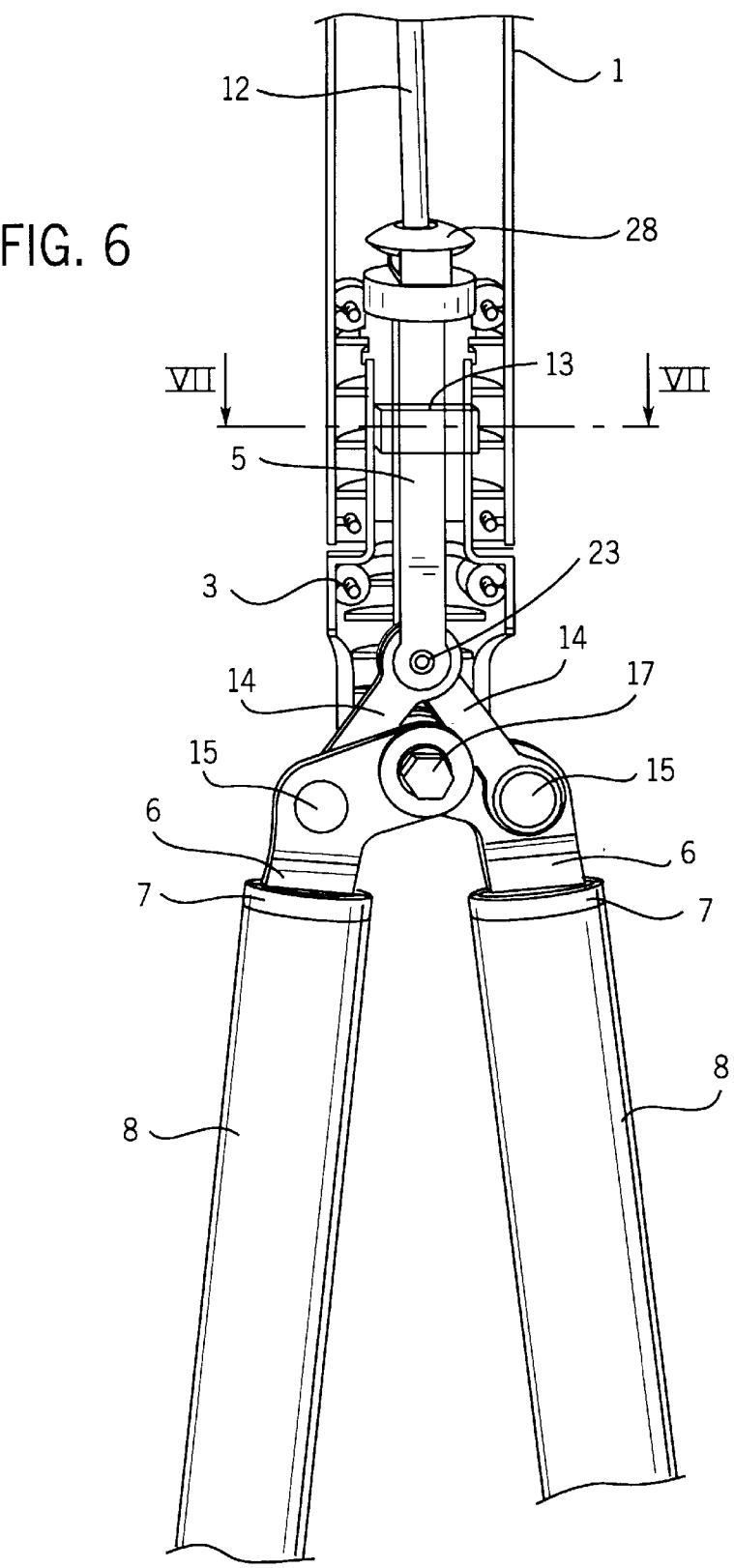
FIG. 6 is a detail view of the apparatus for lopping illustrated in FIG. 5.
Figure 7:
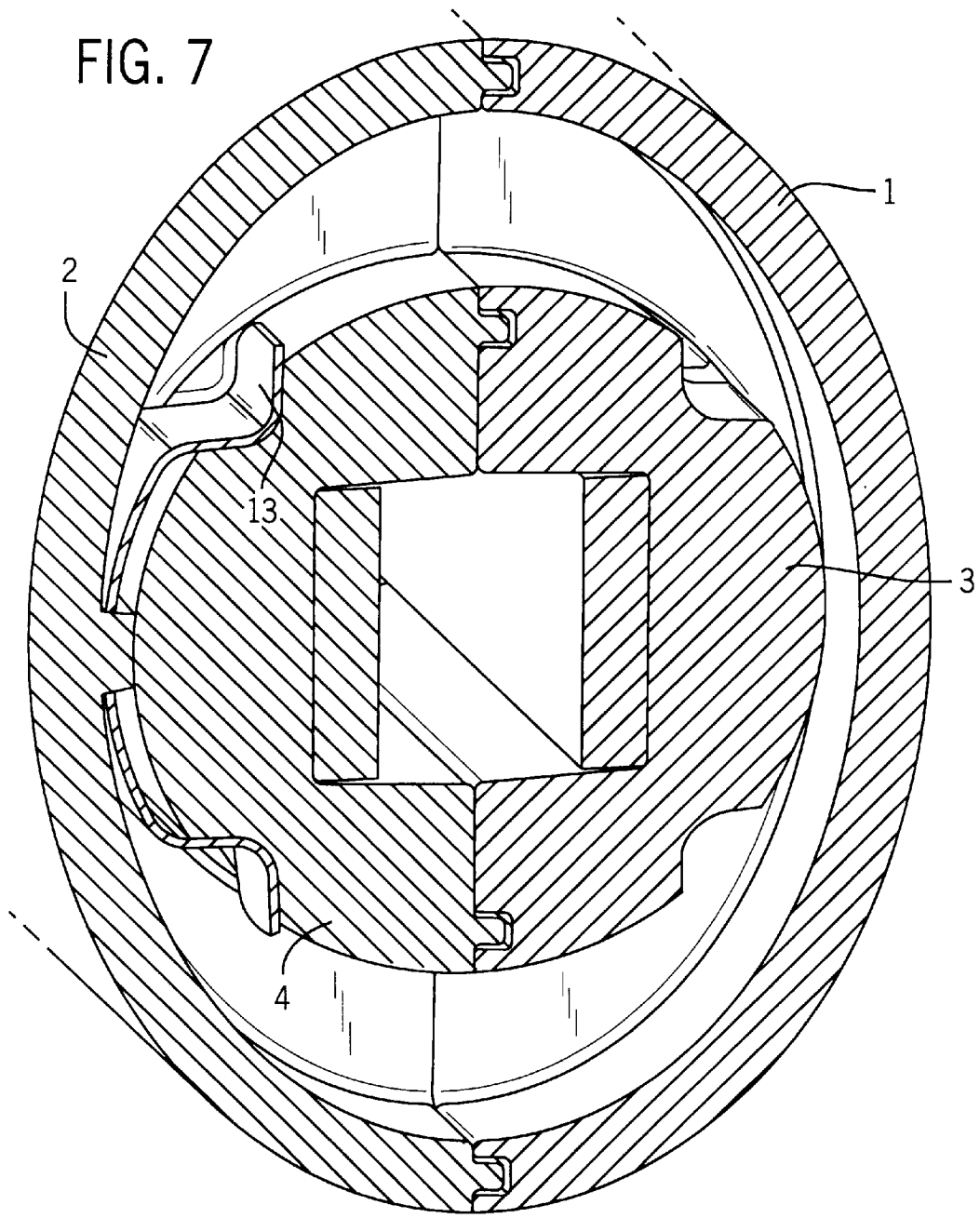
FIG. 7 is a perspective view of cross-section VII—VII shown in FIG. 6.

A proximal end of the neck tube surrounds and is rotatably supported with respect to a yoke. The yoke may be formed as a single, integral structure or it may comprise a bottom portion 3 and a top portion 4 that are fixedly connected together by any suitable fastener(s). As best shown in FIG. 6, the yoke and the neck tube may include respective radially extending flanges that closely overlap one another so as to provide a barrier to the ingress of debris between the yoke and the neck tube. Additionally, these flanges may axially locate the neck tube with respect to the yoke.

A slider 5 is received in and is linearly translatable with respect to the yoke. A pin 23 pivotally connects a proximal end of the slider 5 and one end of at least one link 14 (two links 14 are illustrated in FIGS. 1–7). The other ends of links 14 are pivotally connected with respective handle tangs 6 by link rivets 15. Distal ends of the handle tangs 6 are also pivotally connected to one another, and to the yoke, via a pivot bolt 20, washers 27 (only one is indicated), a pivot bushing 16 and a pivot spacer 17.

Handle ferrules 7 fixedly connect handle tangs 6 with respective handles 8. Handle grips 9 may be fixedly connected at the proximal ends of the handles 8. A bumper 22 located between the proximal end of the slider 5 and the handle tangs 6 prevents undesirable noise and impact when the handles 8 are brought to their minimal relative angular position.

A pair of jaws 10 and 11 are supported at the distal end of the neck tube and are pivotally connected to one another by a bolt 21, a nut 18 and a washer 19. In a preferred embodiment of the present invention a first jaw 10 is also pivotally supported with respect to the neck tube, and a second jaw 11 is fixedly connected with respect to the neck tube. As discussed above, the jaws 10,11 may have opposing faces adapted for gripping an object between the jaws 10,11. Alternatively, at least one of the jaws 10,11 may include a cutting blade.

The distal end of the slider 5 is operatively connected by a bolt 24 to the first jaw 10. According to a preferred embodiment of the present invention, the slider 5 further comprises a rod 12. The rod 12 is pivotally connected with respect to the first jaw 10 by the bolt 24. A rod seat 28 provides a tiltable and rotatable connection for the rod 12 with respect to the linearly translatable portion of the slider 5. Thus, the rod 12 is able to pivot with respect to the linearly translatable portion of the slider 5, regardless of their relative rotation.

A debris curtain 26 prevents the ingress of unwanted material at the distal end of the neck tube.

A drag mechanism applies a retarding force to prevent free relative rotation between the neck tube and the yoke. This enables the neck tube to be readily turned and reliably maintained at a desired rotary position relative to the yoke. According to a preferred embodiment of the present invention, a detent spring 13 has a hole in a central portion that is held on a radially inward extending projection from the neck. Ends of the detent spring 13 are adapted to be received in a plurality of detents (four are shown) formed on an exterior surface of the yoke. In the illustrated embodiment, the detents are oriented to maintain the jaws 10,11 at radial positions that are offset by 90° from each other such that the jaws may face a first direction in the plane of the handle movement, the jaws 10,11 may face a second, opposite direction in the plane of the handle movement, the jaws 10,11 may face a first side of the plane of the handle movement, or the jaws 10,11 may face a second, opposite side of the plane of the handle movement. Of course, there may be fewer or more detents, and the detents may be arranged to maintain the jaws 11,12 in different orientations with respect to the plane of the handle movement. In one embodiment of the present invention, there are no detents on the exterior surface of the yoke. In this embodiment, the frictional engagement of the ends of the spring 13 on the exterior surface provides a sufficient drag force to prevent free rotation of the neck tube relative to the yoke.

In operation, the handles 8 are moved between their minimal relative angular position and their maximal relative angular position. In response thereto, slider 5 is linearly reciprocated by the link(s) 14. The linear motion of the slider 5 is causes jaw 10 to pivot with respect to jaw 11. If it is desirable to reorient the jaws 10,11 with respect to the plane of handle movement, the neck tube may be grasped and turned relative to the yoke against the drag force being applied by the spring 13. The spring 13 also maintains the desired relative rotary position.

According to the present invention, no additional tools, equipment or supplies are necessary to selectively rotate and maintain the relative rotary position of the neck tube, and thus the jaws 10,11, with respect to the handles 8.

The range of lopping motion according the present invention provides optimum cutting efficiency for a wide variety of user positions and user sizes. The inventors of the present invention have determined that the range of lopping motion in a horizontal position is from a shoulder abduction angle of approximately 90° to approximately 0°. The swivel head according to present invention, as will be described below, eliminates the need to consider the range of lopping motion in a vertical position.

Figure 8A:
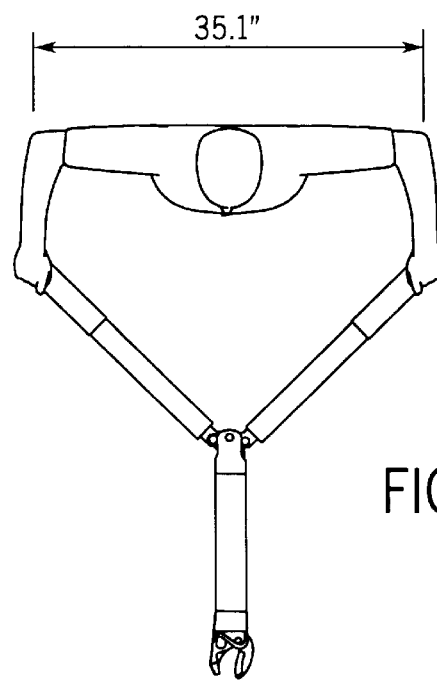
FIGS. 8A–8C are top, front and side anthropomorphic diagrams illustrating the maximum separation distance for a user of the apparatus according to the present invention.
Figure 8B:
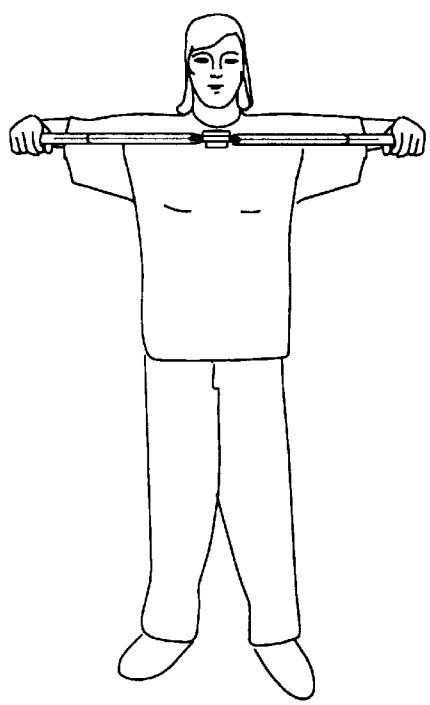
Figure 8C:
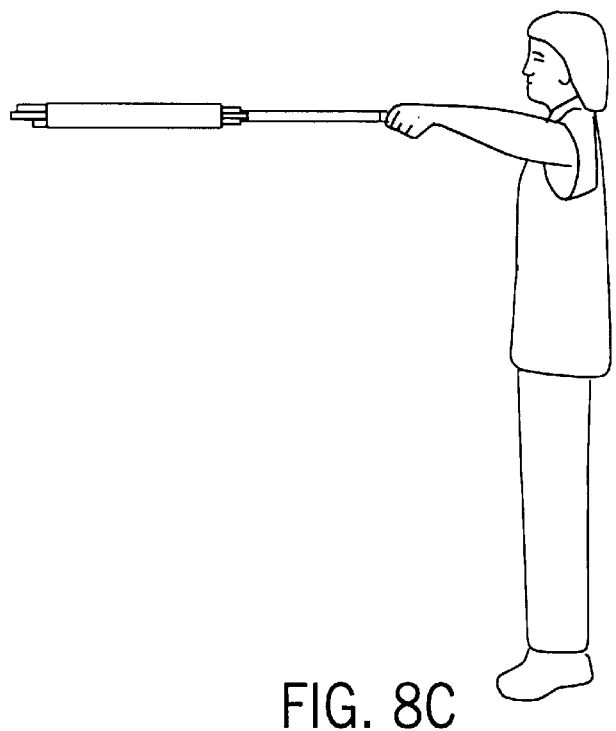
Figure 9A:
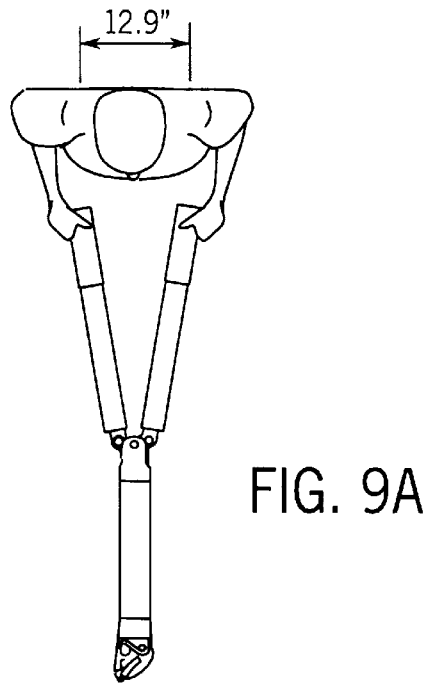
FIGS. 9A–9C are top, front and side anthropomorphic diagrams illustrating the minimum separation distance for a user of the apparatus according to the present invention.
Figure 9B:
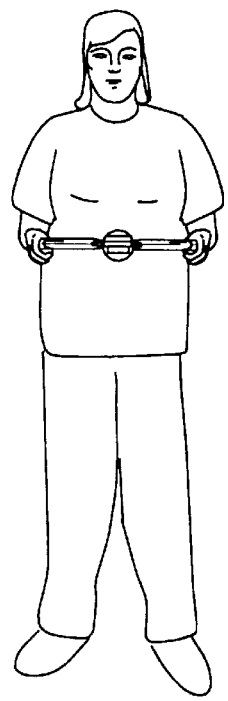
Figure 9C:
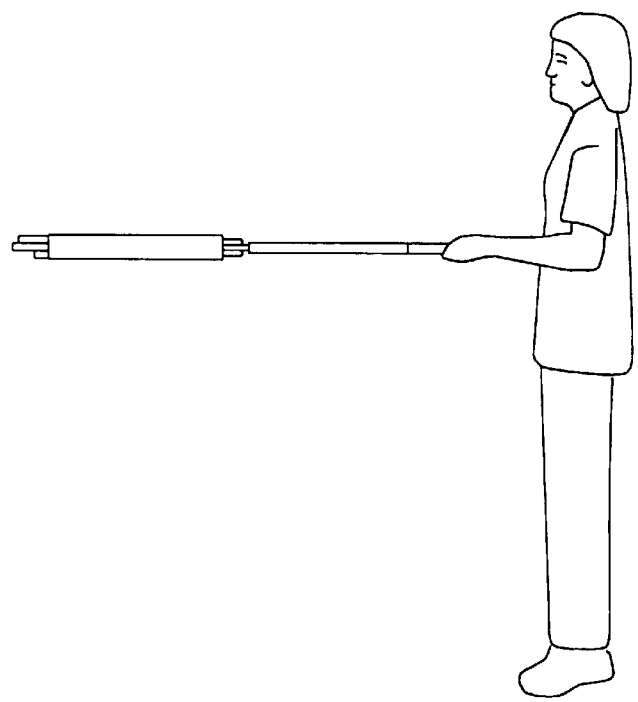
Figure 10A:
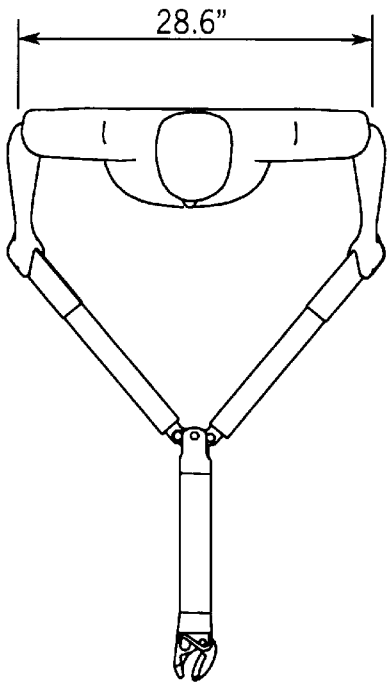
FIGS. 10A–10C are top, front and side anthropomorphic diagrams illustrating the optimal separation distance for a user of the apparatus according to the present invention.
Figure 10B:
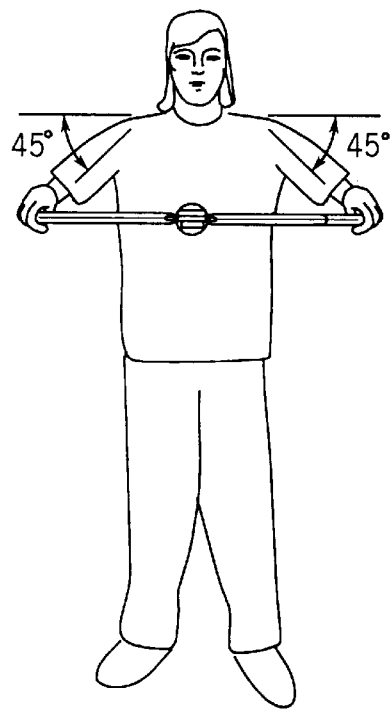
Figure 10C:
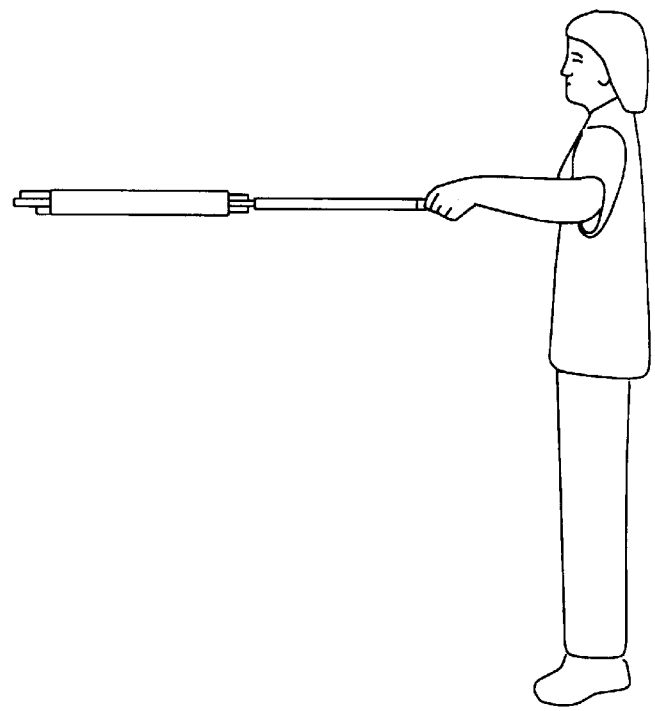

The inventors of the present invention have used the anthropomorphic data for a fifth percentile female as an appropriate basis for accommodating the variety of user sizes. A fifth percentile female is the smallest user for which data is given in NASA publication 1024, "Anthropomorphic Source Book for Designers" (1978). For such a fifth percentile female, the maximum elbow separation distance for shoulders elevated parallel to the ground, i.e., at a 90° shoulder abduction angle, is approximately 35.1" (see FIGS. 8A–8C). This dimension corresponds to lopping motions at shoulder height. At a 45° shoulder abduction angle, the maximum elbow separation distance for a fifth percentile female is 28.6" (see FIGS. 9A–9C). This dimension generally corresponds to optimal lopping motions at lower levels below shoulder height. The minimum elbow separation distance for a fifth percentile female is 12.9" (see FIGS. 10A–10C). Minimum elbow separation occurs when the user's upper arms are in a vertical orientation and adjacent to the torso.

The inventors of the present invention have also recognized that maximum torque is exerted when the user's shoulders, elbows and back lie in a substantially common plane. Additionally, the inventors of the present invention have determined that the maximum input force required for cutting the maximum size limb should be approximately 70 pounds-force (lbf).

Figure 11:
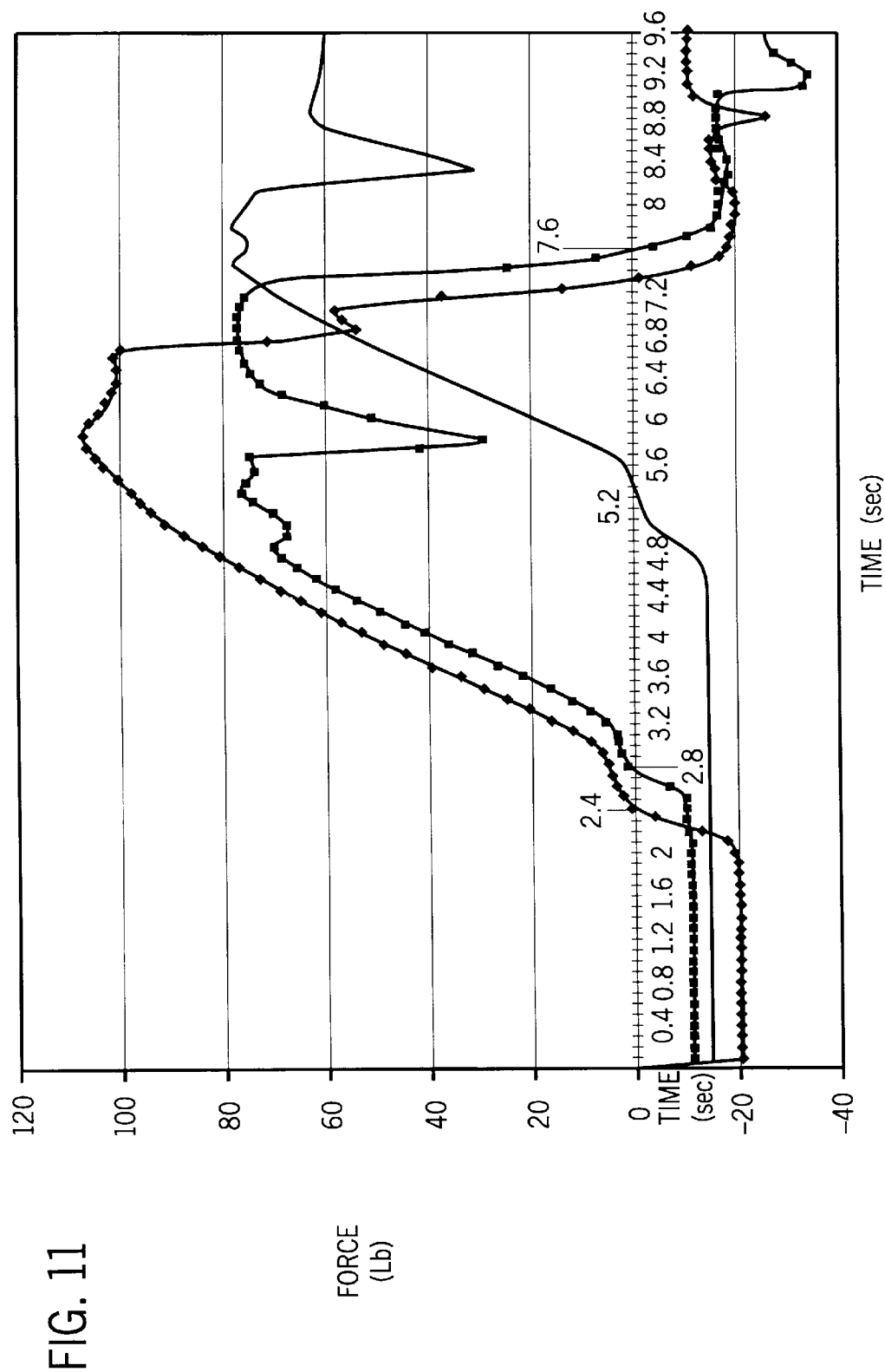
FIG. 11 is a graph depicting exemplary cutting profiles.

According to the present invention, optimum lopper cutting efficiency is achieved by matching the peak mechanical advantage to the point where the maximum cutting force is required. To achieve optimal lopper cutting efficiency, the inventors of the present invention first determined the cutting profile of a bypass shearing device through wood via experimentation with a conventional tree pruning blade (see FIG. 11). As it is used here, the term "cutting profile" refers to a plot of required cutting forces versus cutting time. It is assumed that the cutting profile is similar for any bypass shearing device through wood. Second, the inventors of the present inventors determined experimentally that the maximum cutting force required for lopping a 1.6" diameter live oak is approximately 1000 lbf (see FIG. 12).

Figure 13:
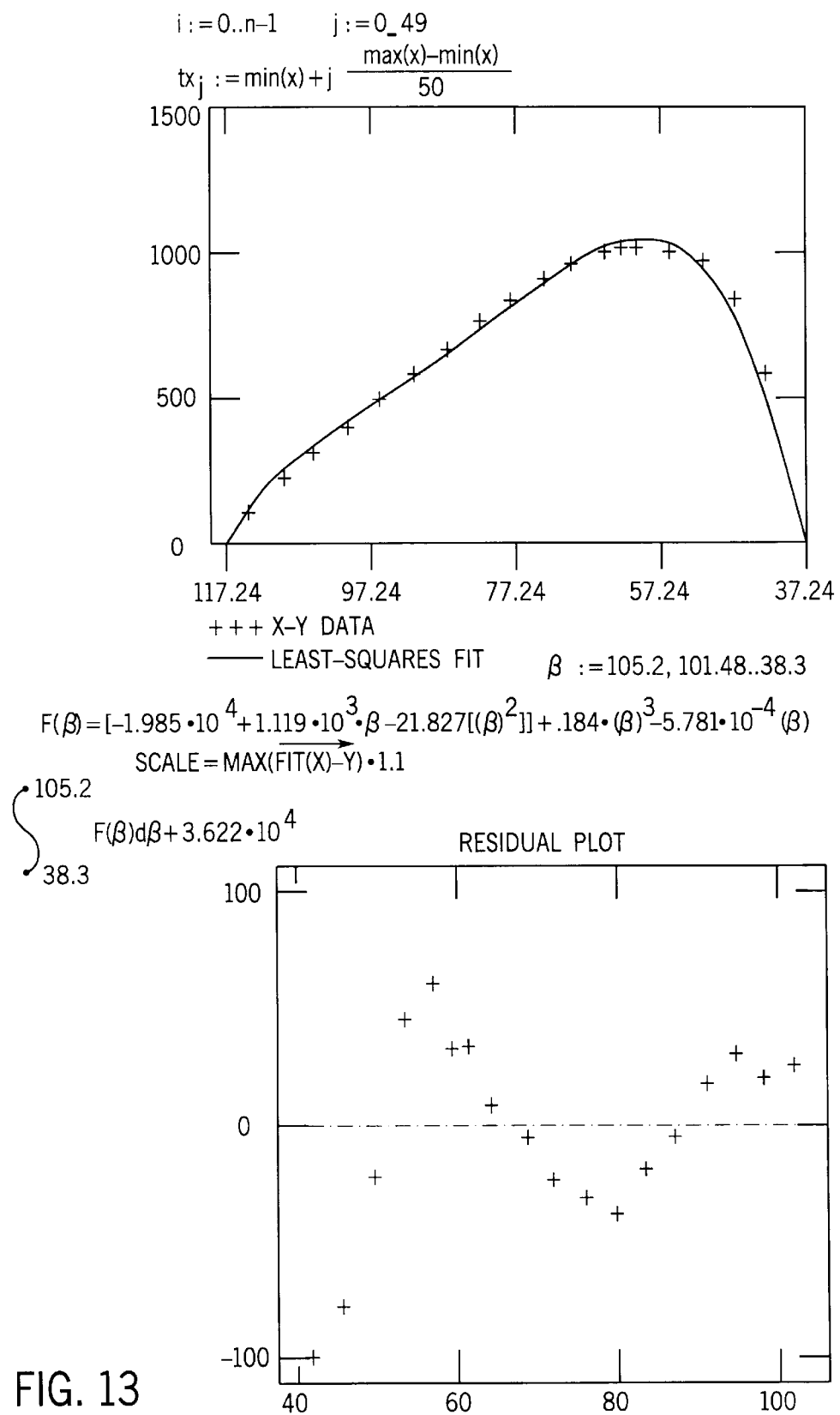
FIG. 13 illustrates an example of a curve fitting technique for the cutting profiles illustrated in FIG. 11.
Figure 14:
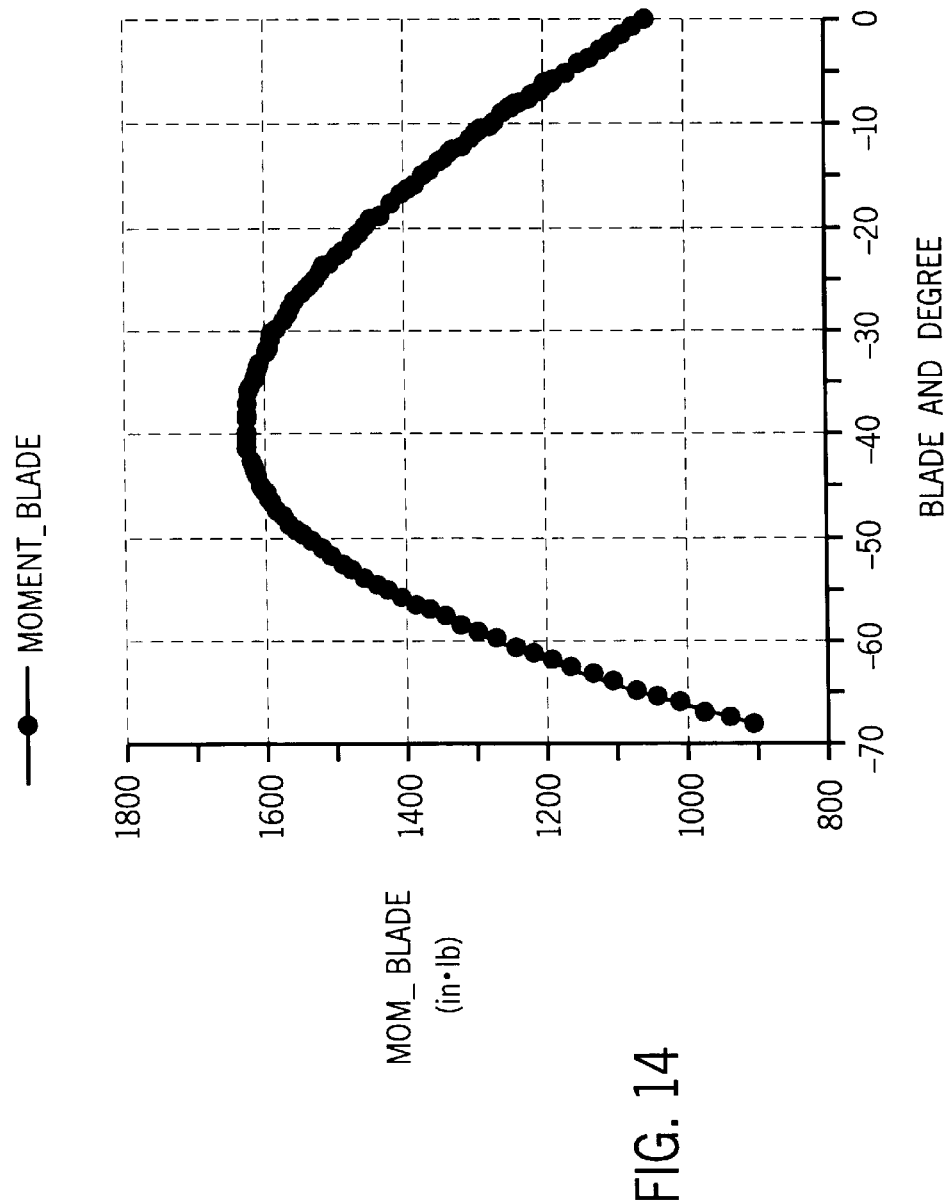
FIG. 14 is a graph depicting a theoretical blade movement, at the cutting edge of the blade, so as to match a cutting profile, such as one of those shown in FIG. 11, that has been re-scaled based on the test data collected in FIG. 12 and the curve fitting technique of FIG. 13.

Third, the cutting profile was re-scaled so as to have its peak force set at 1000 lbf, and the horizontal axis was re-scaled for angular displacement, i.e., rotation, of the cutting blade (see FIG. 14). It is assumed that the new blade cuts as well as the conventional blade, and that the conventional blade rotated at a constant angular velocity. Fourth, a curve fitting routine was applied to the re-scaled cutting profile to develop an equation for the force at the blade as a function of the blade's rotation where the maximum blade force is achieved approximately half-way through the blade's rotation (see FIG. 13). Achieving maximum blade force near the midpoint of blade rotation was determined by the inventors to be the desired output profile for the present invention. As a check, the curve function expressed by the equation was integrated to determine the work of the blade and compared to estimates of the work required to lop the 1.6" diameter live oak.

Fifth, the inventors of the present invention used motion analysis techniques to optimize the design of the apparatus according to the present invention. Specifically, the inventors performed an iterative process involving changing linkage lengths to achieve the desired output profile and remain within the constraints of the desired anthropomorphic data. A preferred embodiment of the present invention has a cutting capacity of 1.6", handles that are 18" long, a maximum handle separation at opening of 32", a minimum handle separation at close of 6", and 68° of blade rotation.

Alternative designs that were evaluated by the inventors of the present invention include two stationary meshing gears, rack and pinion gears, double linkage mechanisms, and a flexible strap. For the stationary gears, both constant radius and variable radius gears were evaluated. In the cases of the stationary gears, the objectives of the invention could only be met with designs in which the overall bulk was increased to unacceptable levels that adversely affected the safe and comfortable operation, as well as the aesthetic appearance, of the apparatus. In the case of rack and pinion gears, the gear radius could be approximately halved; however, the objectives of the invention could still only be met with designs in which the overall bulk was increased to unacceptable levels that adversely affected the safe and comfortable operation, as well as the aesthetic appearance, of the apparatus. A double linkage mechanism in combination with the blade and rod design according to the present invention was able to achieve the desired output profile. The inventors of the present invention determined that a double linkage mechanism has a force profile that increases through the entire stroke that results in wasted work at the end of the stroke. A flexible strap mechanism is able to provide an adequate pulling force on the blades; however, the flexible strap mechanism is not able to provide a pushing force such as would be necessary to extract the cutting blade(s) that have become stuck in a limb.

Although the present invention has been described in terms of a particular preferred embodiments, it is not limited to those embodiments. Alternative embodiments, examples, and modifications that would still be encompassed by the invention may be made by those skilled in the art, particularly in light of the foregoing teachings.

What is claimed is:

1. An apparatus for remotely gripping or cutting an object, the apparatus comprising:

a first handle pivotally connected to a second handle for relative motion in a common plane, said first and second handles being adapted for orientation in a minimal relative angular position and for orientation in a maximal relative angular position;

a first link having first and second ends, said first end of said first link being pivotally connected to said first handle and said second end of said first link being adapted for linear reciprocating motion in responsive association with relative motion of said first and second handles between said minimal and maximal relative angular positions;

a slider pivotally connected to said second end of said first link, said slider being adapted for linear reciprocating motion in responsive association with relative motion of said first and second handles between said minimal and maximal relative angular positions;

a cylindrical extension extending substantially coaxially with respect to said linear reciprocating motion, said cylindrical extension having a proximal end being supported for relative rotation around said slider and having a distal end with respect to said first and second handles;

a drag mechanism supported with respect to said cylindrical extension, said drag mechanism being adapted for providing a selected limited resistance to free relative rotation of said cylindrical extension with respect to said slider; and a first jaw pivotally connected with respect to a second jaw, said first jaw being supported with respect to said distal end of said cylindrical extension, said second jaw having an actuated arm and an actuating arm and having the pivotal connection with respect to said first jaw being interposed between said actuated and actuating arms, said actuating arm being pivotally connected with respect to said slider;

wherein the object is engaged by said actuated arm of said second jaw being pivoted toward said first jaw in responsive association with said linear reciprocating motion of said slider as said first and second handles are reoriented from said maximal relative angular position to said minimal relative angular position.

2. An apparatus for remotely gripping or cutting an object, the apparatus comprising:

a first handle pivotally connected to a second handle for relative motion in a common plane, said first and second handles being adapted for orientation in a minimal relative angular position and for orientation in a maximal relative angular position;

a first link having first and second ends, said first end of said first link being pivotally connected to said first handle and said second end of said first link being adapted for linear reciprocating motion in responsive association with relative motion of said first and second handles between said minimal and maximal relative angular positions;

a second link having first and second ends, said first end of said second link being pivotally connected to said second handle and said second end of said second link being pivotally connected to said second end of said first link, said second end of said second link being adapted for linear reciprocating motion in responsive association with relative motion of said first and second handles between said minimal and maximal relative angular positions;

a slider pivotally connected to said second ends of said first and second links, said slider being adapted for linear reciprocating motion in responsive association with relative motion of said first and second handles between said minimal and maximal relative angular positions;

a cylindrical extension extending substantially coaxially with respect to said linear reciprocating motion, said cylindrical extension having a proximal end being supported for relative rotation around said slider and having a distal end with respect to said first and second handles;

a drag mechanism supported with respect to said cylindrical extension, said drag mechanism being adapted for providing a selected limited resistance to free relative rotation of said cylindrical extension with respect to said slider; and a first jaw pivotally connected with respect to a second jaw, said first jaw being supported with respect to said distal end of said cylindrical extension, said second jaw having an actuated arm and an actuating arm and having the pivotal connection with respect to said first jaw being interposed between said actuated and actuating arms, said actuating arm being pivotally connected with respect to said slider;

wherein the object is engaged by said actuated arm of said second jaw being pivoted toward said first jaw in responsive association with said linear reciprocating motion of said slider as said first and second handles are reoriented from said maximal relative angular position to said minimal relative angular position.

3. An apparatus for remotely gripping or cutting an object, the apparatus comprising:

a first handle pivotally connected to a second handle for relative motion in a common plane, said first and second handles being adapted for orientation in a minimal relative angular position and for orientation in a maximal relative angular position;

a first link having first and second ends, said first end of said first link being pivotally connected to said first handle and said second end of said first link being adapted for linear reciprocating motion in responsive association with relative motion of said first and second handles between said minimal and maximal relative angular positions;

a slider pivotally connected to said second end of said first link and including a rod having first and second ends, said first end of said rod being tiltably supported relative to said second end of said first link, said slider being adapted for linear reciprocating motion in responsive association with relative motion of said first and second handles between said minimal and maximal relative angular positions;

a cylindrical extension extending substantially coaxially with respect to said linear reciprocating motion, said cylindrical extension having a proximal end being supported for relative rotation around said slider and having a distal end with respect to said first and second handles;

a drag mechanism supported with respect to said cylindrical extension, said drag mechanism being adapted for providing a selected limited resistance to free relative rotation of said cylindrical extension with respect to said slider; and a first jaw pivotally connected with respect to a second jaw, said first jaw being supported with respect to said distal end of said cylindrical extension, said second jaw having an actuated arm and an actuating arm and having the pivotal connection with respect to said first jaw being interposed between said actuated and actuating arms, said second end of said rod being pivotally connected to said actuating arm of said second jaw;

wherein the object is engaged by said actuated arm of said second jaw being pivoted toward said first jaw in responsive association with said linear reciprocating motion of said slider as said first and second handles are reoriented from said maximal relative angular position to said minimal relative angular position.

4. An apparatus for remotely gripping or cutting an object, the apparatus comprising:

a first handle pivotally connected to a second handle for relative motion in a common plane, said first and second handles being adapted for orientation in a minimal relative angular position and for orientation in a maximal relative angular position;

a first link having first and second ends, said first end of said first link being pivotally connected to said first handle and said second end of said first link being adapted for linear reciprocating motion in responsive association with relative motion of said first and second handles between said minimal and maximal relative angular positions;

a slider pivotally connected to said second end of said first link, said slider being adapted for linear reciprocating motion in responsive association with relative motion of said first and second handles between said minimal and maximal relative angular positions;

a cylindrical extension extending substantially coaxially with respect to said linear reciprocating motion, said cylindrical extension having a proximal end being supported for relative rotation around said slider and having a distal end with respect to said first and second handles;

a drag mechanism supported with respect to said cylindrical extension, said drag mechanism being adapted for providing a selected limited resistance to free relative rotation of said cylindrical extension with respect to said slider;

a first jaw pivotally connected with respect to a second jaw, said first jaw being supported with respect to said distal end of said cylindrical extension, said second jaw having an actuated arm and an actuating arm and having the pivotal connection with respect to said first jaw being interposed between said actuated and actuating arms, said actuating arm being pivotally connected with respect to said slider; and a first yoke portion and a second yoke portion being respectively located on opposite sides of said common plane, said first and second yoke portions being pivotally supported with respect to said first and second handles, said first and second yoke portions projecting between said slider and said cylindrical extension;

wherein the object is engaged by said actuated arm of said second jaw being pivoted toward said first jaw in responsive association with said linear reciprocating motion of said slider as said first and second handles are reoriented from said maximal relative angular position to said minimal relative angular position.

5. The apparatus according to claim 4, wherein said drag mechanism includes a detent mechanism interposed between said yoke and said cylindrical extension, said detent mechanism being adapted for releasably holding said cylindrical extension in one of a plurality of discrete relative rotation positions of said cylindrical extension with respect to said slider.

6. An apparatus for remotely gripping or cutting an object, the apparatus comprising:

a first handle pivotally connected to a second handle for relative motion in a common plane, said first and second handles being adapted for orientation in a minimal relative angular position and for orientation in a maximal relative angular position;

a first link having first and second ends, said first end of said first link being pivotally connected to said first handle and said second end of said first link being adapted for linear reciprocating motion in responsive association with relative motion of said first and second handles between said minimal and maximal relative angular positions;

a slider pivotally connected to said second end of said first link, said slider being adapted for linear reciprocating motion in responsive association with relative motion of said first and second handles between said minimal and maximal relative angular positions;

a cylindrical extension extending substantially coaxially with respect to said linear reciprocating motion, said cylindrical extension having a proximal end being supported for relative rotation around said slider and having a distal end with respect to said first and second handles;

a drag mechanism supported with respect to said cylindrical extension, said drag mechanism being adapted for providing a selected limited resistance to free relative rotation of said cylindrical extension with respect to said slider; and a first jaw pivotally connected with respect to a second jaw, said first jaw is fixedly connected with respect to said distal end of said cylindrical extension, said second jaw having an actuated arm and an actuating arm and having the pivotal connection with respect to said first jaw being interposed between said actuated and actuating arms, said actuating arm being pivotally connected with respect to said slider;

wherein the object is engaged by said actuated arm of said second jaw being pivoted toward said first jaw in responsive association with said linear reciprocating motion of said slider as said first and second handles are reoriented from said maximal relative angular position to said minimal relative angular position.

7. The apparatus according to claim 1, wherein said first and second handles are spaced apart from one another no more than 35.1" at said maximal relative angular orientation.

8. The apparatus according to claim 7, wherein said first and second handles are spaced apart from one another at least 28.6" at said maximal relative angular orientation.

9. The apparatus according to claim 7, wherein said first and second handles are spaced apart from one another approximately 32" at said maximal relative angular orientation.

10. The apparatus according to claim 1, wherein said first and second handles are spaced apart from one another no more than 12.9" at said minimal relative angular orientation.

11. The apparatus according to claim 10, wherein said first and second handles are spaced apart from one another approximately 6" at said minimal relative angular orientation.

12. The apparatus according to claim 1, wherein said second jaw is adapted to pivot 68° with respect to said first jaw.

13. The apparatus according to claim 1, wherein at least one of the first and second jaws includes a cutting blade.

14. The apparatus according to claim 13, wherein the pivotal connection between said first and second jaws has the capacity to lop an object having a diameter of 1.6".

* * * * *